United States Patent
Sutardja

(10) Patent No.: US 8,856,423 B1
(45) Date of Patent: Oct. 7, 2014

(54) DUAL-PURPOSE NONVOLATILE MEMORY FOR CODE AND DATA STORAGE

(75) Inventor: Pantas Sutardja, Los Gatos, CA (US)

(73) Assignee: Marvell International Ltd., Hamilton (BM)

( * ) Notice: Subject to any disclaimer, the term of this patent is extended or adjusted under 35 U.S.C. 154(b) by 432 days.

(21) Appl. No.: 11/789,971

(22) Filed: Apr. 26, 2007

Related U.S. Application Data

(60) Provisional application No. 60/910,929, filed on Apr. 10, 2007.

(51) Int. Cl.
*G06F 12/00* (2006.01)
*G06F 13/00* (2006.01)
*G06F 13/28* (2006.01)

(52) U.S. Cl.
USPC ............ 711/103; 711/113; 711/115; 711/118

(58) Field of Classification Search
USPC ............................ 711/103, 113, 115, 118–146
See application file for complete search history.

(56) References Cited

U.S. PATENT DOCUMENTS

| | | | |
|---|---|---|---|
| 6,134,631 A * | 10/2000 | Jennings, III | 711/117 |
| 6,154,834 A * | 11/2000 | Neal et al. | 712/248 |
| 6,480,929 B1 * | 11/2002 | Gauthier et al. | 711/105 |
| 6,721,843 B1 * | 4/2004 | Estakhri | 711/103 |
| 7,533,215 B2 * | 5/2009 | Faber | 711/103 |
| 2004/0103238 A1 * | 5/2004 | Avraham et al. | 711/102 |
| 2004/0123033 A1 * | 6/2004 | Rudelic | 711/118 |
| 2006/0095649 A1 * | 5/2006 | Netter et al. | 711/103 |
| 2007/0106836 A1 * | 5/2007 | Lee et al. | 711/103 |

* cited by examiner

*Primary Examiner* — Yaima Rigol

(57) ABSTRACT

A control module for controlling a solid-state disk (SSD) includes a first interface, a cache memory, and a second interface. The first interface interfaces a nonvolatile semiconductor memory (NVM) of the SSD to a processor that is located externally to the SSD. The cache memory selectively caches at least one of code and data from the NVM. The second interface interfaces the cache memory to the processor and outputs portions of at least one of code and data from the cache memory to the processor.

17 Claims, 10 Drawing Sheets

DUAL-PURPOSE NONVOLATILE MEMORY FOR CODE AND DATA STORAGE

CROSS-REFERENCE TO RELATED APPLICATIONS

This application claims the benefit of U.S. Provisional Application No. 60/910,929, filed Apr. 10, 2007. The disclosure of the above application is incorporated herein by reference in its entirety.

FIELD

The present disclosure relates to data processing systems, and more particularly to storing program code and data in a dual-purpose nonvolatile storage system.

BACKGROUND

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Data processing systems include processors that execute program code and process data. The program code (code) such as an operating system (OS) includes a set of commands or instructions that a processor executes to process data. Referring now to FIG. 1, a data processing system 10 includes a processor 12, a disk drive 14, a host adapter 16, and a system memory 18. The processor 12, the host adapter 16, and the system memory 18 communicate via a system bus 20.

The disk drive 14 stores data on magnetic surfaces. The disk drive 14 communicates with the host adapter 16 via a standard I/O interface 24 such as ATA, SATA, USB, etc. The host adapter 16 reads the code and data from the disk drive 14 into the system memory 18. The processor 12 reads the code and data from the system memory 18, executes the code, and processes the data in the system memory 18. The host adapter 16 may read the processed data from the system memory 18 and store the processed data in the disk drive 14.

The disk drive 14 stores the code and data in a nonvolatile manner. Thus, the disk drive 14 can provide the code and data to the processor 12 every time power is turned on. The disk drive 14, however, provides code and data to the processor 12 at a rate that is slower than the rate at which the processor 12 can execute the code and process the data. On the other hand, the system memory 18 is generally volatile. That is, contents of the system memory 18 may be lost when power is turned off. But the system memory 18 can provide the code and data to the processor 12 faster than the disk drive 14.

The processor 12 may execute the code and process the data from the system memory 18 while the host adapter 16 loads additional portions of the code and/or data into the system memory 18. The processor 12, however, can execute the code and process the data from the system memory 18 faster than the rate at which the host adapter 16 can load additional code and data into the system memory 18 from the disk drive 14. Moreover, since the system memory 18 is generally volatile, the host adapter 16 needs to load portions of the code and data into the system memory 18 every time power is turned on. Thus, the processor 12 may wait until portions of the code and data are loaded into the system memory 18.

SUMMARY

A control module for controlling a solid-state disk (SSD) comprises a first interface, a cache memory, and a second interface. The first interface interfaces a nonvolatile semiconductor memory (NVM) of the SSD to a processor that is located externally to the SSD. The cache memory selectively caches at least one of code and data from the NVM. The second interface interfaces the cache memory to the processor and outputs portions of at least one of code and data from the cache memory to the processor.

In another feature, the control module reads at least one of code and data from the NVM into the cache memory when the processor communicates N requests for at least one of code and data to the SSD, where N is an integer greater than or equal to 1.

In another feature, the NVM comprises flash memory.

In another feature, the cache memory comprises one of volatile and nonvolatile memory.

In another feature, the cache memory comprises one of static random access memory (SRAM), flash memory, and magnetic RAM.

In another feature, the second interface comprises a parallel interface.

In another feature, the first and second interfaces are implemented by a combined interface.

In another feature, an integrated circuit (IC) comprises the control module.

In another feature, a solid-state disk (SSD) comprises the control module and further comprises the NVM and volatile memory, wherein the control module reads at least one of code and data from the NVM into the volatile memory, and wherein the cache memory caches at least one of code and data from the volatile memory.

In another feature, a handheld device comprises the SSD and further comprises a bus, a host adapter that communicates with the bus, and the processor that communicates with the first interface via the host adapter.

In still other features, a method comprises providing a solid-state disk (SSD) having a nonvolatile semiconductor memory (NVM) and a control module and controlling the SSD using the control module having a cache memory and first and second interfaces. The method further comprises selectively caching at least one of code and data from the NVM to the cache memory. The method further comprises interfacing the NVM to a processor located externally to the SSD via the first interface and interfacing the cache memory to the processor via the second interface. The method further comprises outputting portions of at least one of code and data from the cache memory to the processor via the second interface.

In another feature, the method further comprises reading at least one of code and data from the NVM into the cache memory when the processor communicates N requests for at least one of code and data to the SSD, where N is an integer greater than or equal to 1.

In another feature, the NVM comprises flash memory.

In another feature, the cache memory comprises one of volatile and nonvolatile memory.

In another feature, the cache memory comprises one of static random access memory (SRAM), flash memory, and magnetic RAM.

In another feature, the method further comprises implementing the second interface using a parallel interface.

In another feature, the method further comprises combining the first and second interfaces.

In another feature, the method further comprises arranging the control module in an integrated circuit (IC).

In another feature, the method further comprises providing a volatile memory in the SSD, reading at least one of code and data from the NVM into the volatile memory, and caching at least one of code and data from the volatile memory.

In another feature, the method further comprises providing the SSD, the processor, a host adapter, and a bus in a handheld device. The method further comprises transmitting at least one of code and data from the NVM to the processor via the first interface and the host adapter. The method further comprises transmitting the portions of at least one of code and data from the cache memory to the processor via the second interface.

In still other features, a control module for controlling a solid-state disk (SSD) comprises first interface means for interfacing a nonvolatile semiconductor memory (NVM) of the SSD to a processor that is located externally to the SSD. The control module further comprises cache memory means for selectively caching at least one of code and data from the NVM. The control module further comprises second interface means for interfacing the cache memory means to the processor and outputting portions of at least one of code and data from the cache memory means to the processor.

In another feature, the control module reads at least one of code and data from the NVM into the cache memory means when the processor communicates N requests for at least one of code and data to the SSD, where N is an integer greater than or equal to 1.

In another feature, the NVM comprises flash memory.

In another feature, the cache memory means comprises one of volatile and nonvolatile memory means for storing data.

In another feature, the cache memory means comprises one of static random access memory (SRAM) means for storing data, flash memory means for storing data, and magnetic RAM means for storing data.

In another feature, the second interface means comprises parallel interface means for interfacing the cache memory means to the processor.

In another feature, the first and second interface means are implemented by combined interface means for interfacing the control module to the processor.

In another feature, an integrated circuit (IC) comprises the control module.

In another feature, a solid-state disk (SSD) comprises the control module and further comprises the NVM and volatile memory, wherein the control module reads at least one of code and data from the NVM into the volatile memory, and wherein the cache memory means caches at least one of code and data from the volatile memory.

In another feature, a handheld device comprises the SSD and further comprises a bus, a host adapter that communicates with the bus, and the processor that communicates with the first interface means via the host adapter.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
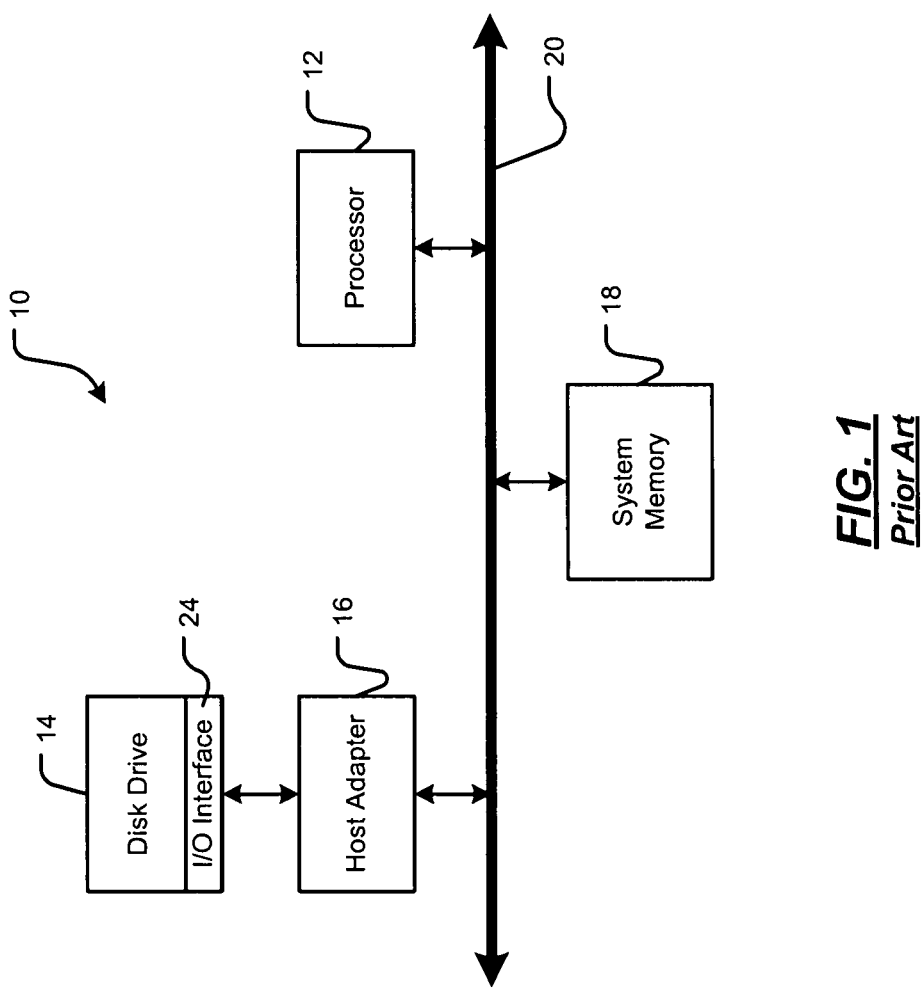
FIG. 1 is a functional block diagram of an exemplary computing system according to the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Modern handheld electronic devices (devices) such as personal digital assistants (PDAs) and cellular phones may include data processing systems (systems) that can perform complex functions. For example, cellular phones that are equipped with a camera may include systems that can take pictures, manipulate the pictures, and communicate the pictures via the Internet. PDAs may include systems that can download, process, and upload video files via the Internet. Performance of these systems can be enhanced by increasing the rate at which code and data is provided to processors in these devices.

Various storage schemes may be used to improve the rate of providing code and data to a processor. For example, a solid-state disk, which has a faster access time than a disk drive that uses rotating magnetic medium, may be used instead of the disk drive to store the code and data. Additionally or alternatively, flash memory, which is nonvolatile and rewritable, may be used to store portions of the code. The flash memory may be interfaced directly to the processor. The processor may execute the portions of the code stored in the flash memory without waiting for the disk drive to provide that information.

Figure 2A:
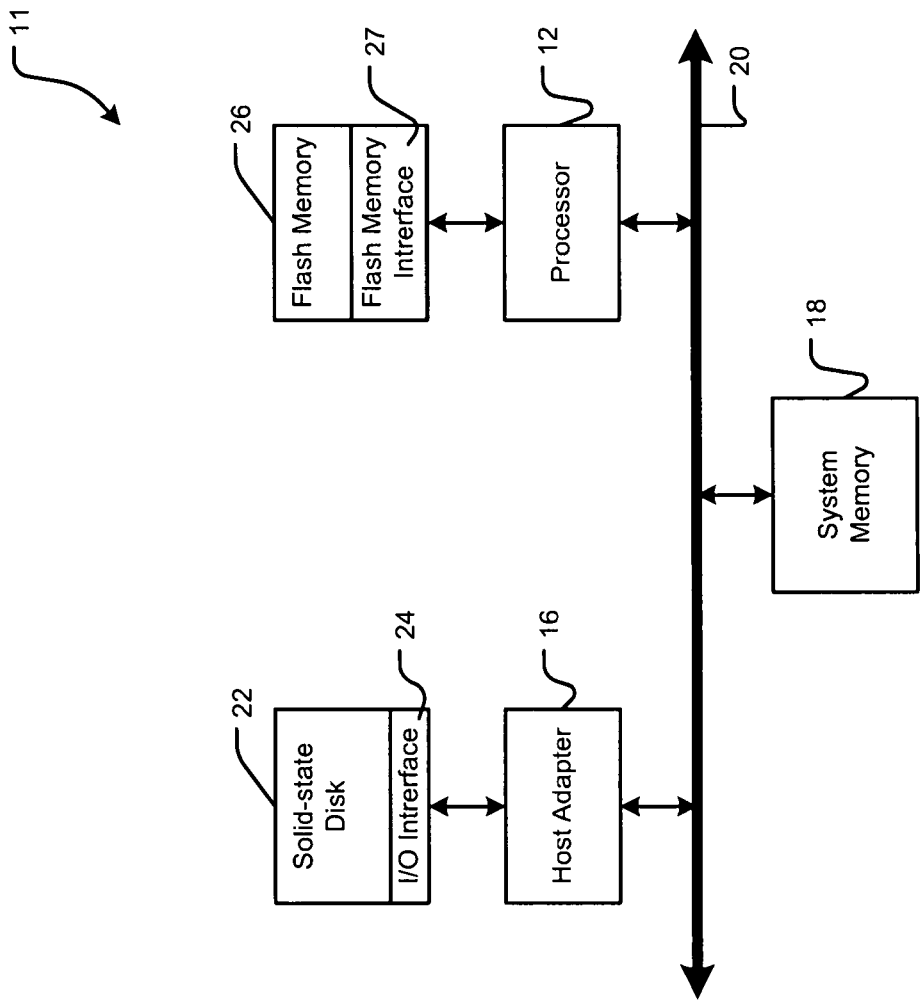
FIG. 2A is a functional block diagram of an exemplary computing system.
Figure 2B:
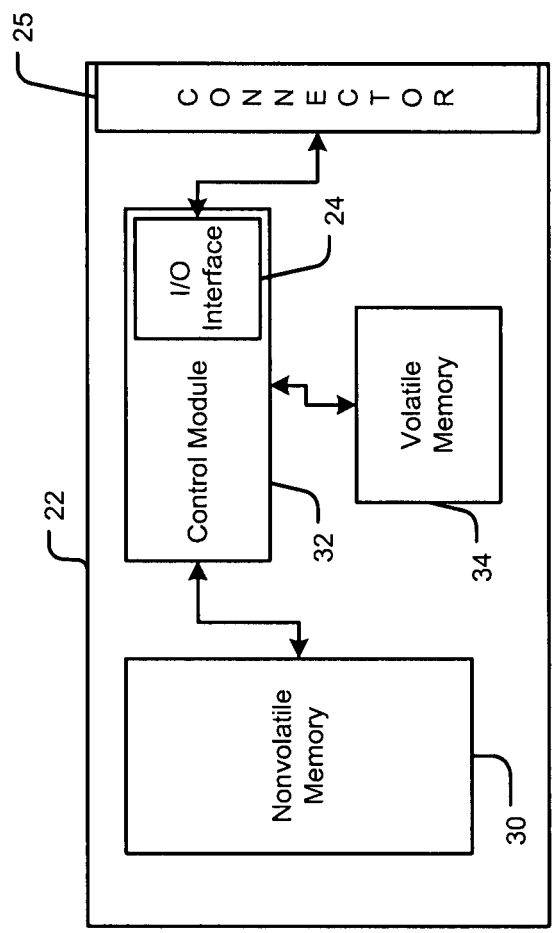
FIG. 2B is a functional block diagram of an exemplary solid-state disk.

Referring now to FIGS. 2A-2B, a system 11 includes the processor 12, a solid-state disk (SSD) 22, the host adapter 16, a flash memory 26, and the system memory 18. The processor 12, the host adapter 16, and the system memory 18 communicate via the system bus 20 as shown in FIG. 2A. The flash memory 26 may be interfaced directly to the processor 12 via a flash memory interface 27.

The SSD 22 stores code and data. The SSD 22 communicates with the host adapter 16 via a standard I/O interface 24 such as ATA, SATA, USB, etc. The host adapter 16 reads the code and the data from the SSD 22 into the system memory 18. The processor 12 reads the code and data from the system memory 18, executes the code, and processes the data in the system memory 18. The host adapter 16 may read the processed data from the system memory 18 and store the processed data in the SSD 22.

The SSD 22 may comprise a nonvolatile semiconductor memory (NVM) 30, a control module 32, and a volatile memory 34 such as dynamic random-access memory (DRAM) as shown in FIG. 2B. The NVM 30 stores the code and the data. The NVM 30 may include flash memory such as NAND flash. NAND flash is nonvolatile and rewritable sequential-access memory that functions like a disk drive. The access time of NAND flash, however, is faster than the access time of the disk drive. Thus, the SSD 22 can provide the code and data to the processor 12 faster than the disk drive.

The control module 32 reads the code from the NVM 30, reads/writes data from/to the NVM 30, erases blocks of the NVM 30, corrects errors, etc. The control module 32 may use volatile memory 34 such as dynamic random-access memory (DRAM) for temporarily storing information related to the control and operation of the SSD 22. The control module 32 provides the I/O interface 24 that communicates with a connector 25. The SSD 22 connects to the host adapter 16 via the connector 25.

When the processor 12 executes portions of the code repeatedly, the processor 12 may read the portions of the code from the SSD 22 into the flash memory 26. Subsequently, the processor 12 may read the portions of the code directly from the flash memory 26 and readily execute the portions of the code. Thus, the processor 12 may not wait for the host adapter 16 to load the portions of the code from the SSD 22 into the system memory 18 and subsequently retrieve the portions of the code from the system memory 18.

The flash memory 26 may include NOR flash, which is an execute-in-place (XIP) memory like read-only memory (ROM). Since NOR flash can be accessed randomly, NOR flash may provide the code to the processor 12 faster than the SSD 22 and the disk drive. In addition to storing the portions of the code, the flash memory 26 may be used to store portions of data that the processor 12 may access and/or process repeatedly.

Many devices may use SSDs to store code and data. Additionally, the devices may include flash memory that is located outside the SSD and that is interfaced directly to a processor in the devices. The flash memory may be used to store portions of code that the processor may execute. Thus, the processor can read the portions of the code directly from the flash memory and readily execute the portions of the code. Additionally, if the processor executes the portions of the code repeatedly or frequently, the processor need not wait for the code to be read again when the code is stored in the flash memory. Including flash memory in the devices in addition to the SSD, however, may increase hardware costs of the devices.

Instead, an internal memory (also called cache memory) such as flash memory or magnetic RAM may be included in the SSD to store portions of the code according to the present disclosure. The internal memory in the SSD may be interfaced directly to the processor via a memory interface that is distinct from an I/O interface with which the SSD communicates with a host adapter. Thus, the processor may directly access the internal memory, read the portions of the code from the internal memory, and readily execute the code, thereby eliminating the need for separate memory that is located externally to the SSD and that is coupled to the processor specifically for storing portions of the code.

Figure 3A:
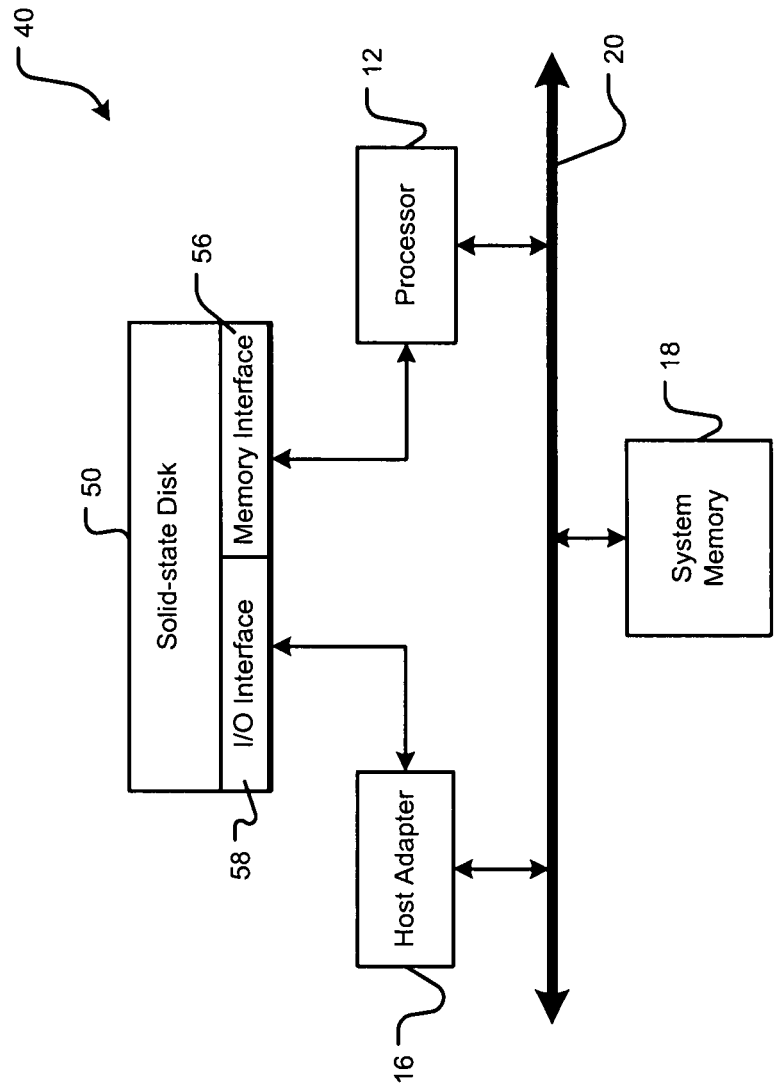
FIG. 3A is a functional block diagram of an exemplary computing system according to the present disclosure.
Figure 3B:
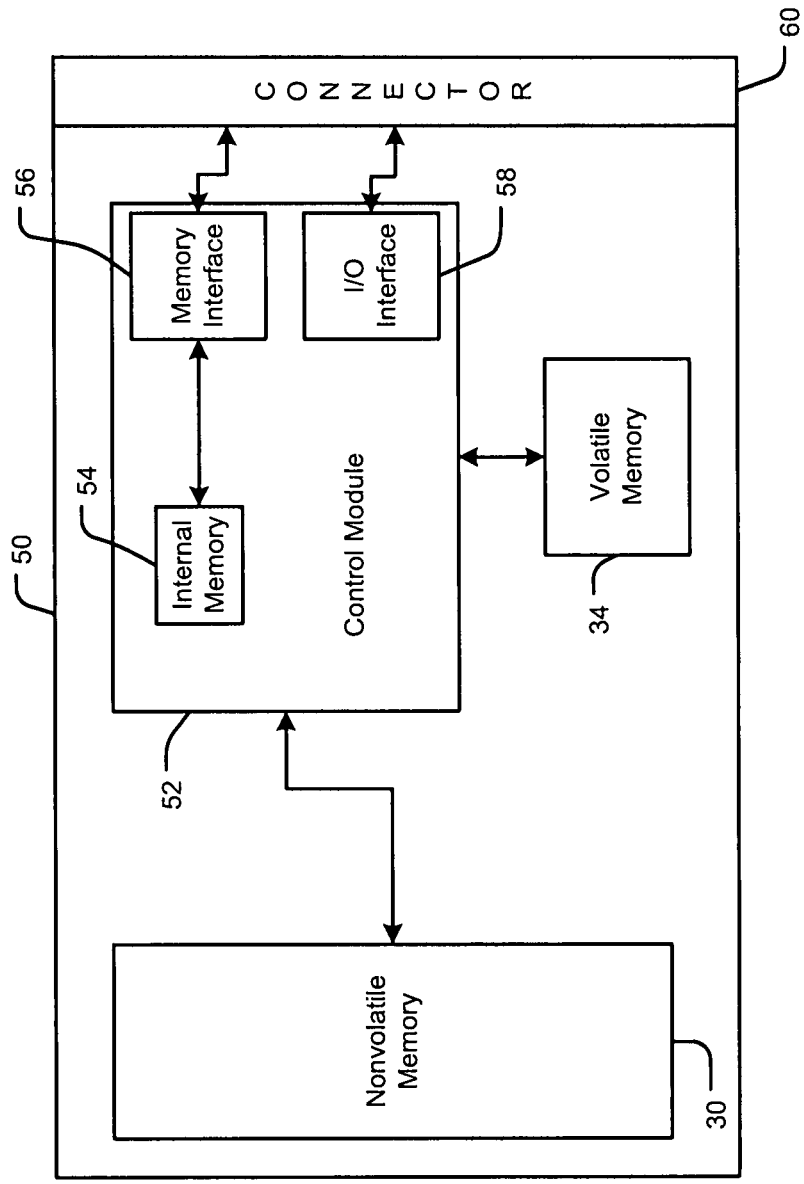
FIG. 3B is a functional block diagram of an exemplary solid-state disk according to the present disclosure.

Referring now to FIGS. 3A-3B, a data processing system 40 may comprise the processor 12, a solid-state disk (disk) 50, the host adapter 16, and the system memory 18. The processor 12, the host adapter 16, and the system memory 18 communicate via the system bus 20.

The disk 50 stores the code and data. The disk 50 communicates with the host adapter 16 via a standard I/O interface 58 such as ATA, SATA, USB, etc. The host adapter 16 reads the code and data from the disk 50 into the system memory 18. The processor 12 reads the code from the system memory 18, executes the code, and processes the data in the system memory 18. The host adapter 16 may read the processed data from the system memory 18 and store the processed data in the disk 50.

The disk 50 may comprise the NVM 30, a control module 52, and the volatile memory 34 such as DRAM. The NVM 30 stores the code and the data. The NVM 30 may include flash memory such as NAND flash. NAND flash is nonvolatile and rewritable sequential-access memory that functions like a disk drive. The access time of NAND flash is faster than the access time of the disk drive. Thus, the disk 50 can provide code and data to the processor 12 faster than the disk drive.

The control module 52 reads the code from the NVM 30, reads/writes data from/to the NVM 30, erases blocks of the NVM 30, corrects errors, etc. The control module 52 may use the volatile memory 34 such as DRAM for temporarily storing information related to the control and operation of the disk 50.

Additionally, the control module 52 comprises an internal memory 54 (also called cache memory). The internal memory 54 is interfaced directly to the processor 12 via a memory interface 56. The memory interface 56 provides a random-access interface with which the processor 12 directly accesses the internal memory 54.

When the processor 12 executes portions of the code, the control module 52 may read the portions of the code from the NVM 30 into the internal memory 54. Alternatively, when the processor 12 repeatedly executes portions of the code, the control module 52 may read the portions of the code from the NVM 30 into the internal memory 54. Additionally, the control module 52 may read the portions of the code from the NVM 30 into the volatile memory 34 and subsequently load the portions of the code from the volatile memory 34 into the internal memory 54.

The processor 12 may directly access the internal memory 54 via the memory interface 56, read the portions of the code stored into the internal memory 54, and execute the portions of the code. Thus, the processor 12 may not wait for the host adapter 16 to read the portions of the code from the disk 50 into the system memory 18 and subsequently retrieve the portions of the code from the system memory 18. In addition to storing the portions of the code, internal memory 54 may be used to store portions of data that the processor 12 may access and/or process repeatedly.

The internal memory 54 may be volatile or nonvolatile and may include any low-latency memory having a fast access time. For example, the internal memory 54 may include volatile memory such as static random access memory (SRAM) or magnetic RAM. Alternatively, the internal memory 54 may include nonvolatile memory such as NOR flash.

Accordingly, the memory interface 56 may be compatible with the type of memory used to implement the internal memory 54. For example, the memory interface 56 may include a NOR flash interface if NOR flash is used to implement the internal memory 54. Regardless of the type of memory used to implement the internal memory 54, the memory interface 56 provides a parallel interface that provides the processor 12 random access to the internal memory 54. Specifically, the parallel interface transmits and receives all bits of information in a byte or a codeword simultaneously.

The control module 52 may provide at least one of the I/O interface 58 and the memory interface 56. The I/O interface 58 and the memory interface 56 may communicate with a connector 60. The disk 50 may communicate with the host adapter 16 and the processor 12 via the connector 60.

Figure 4B:
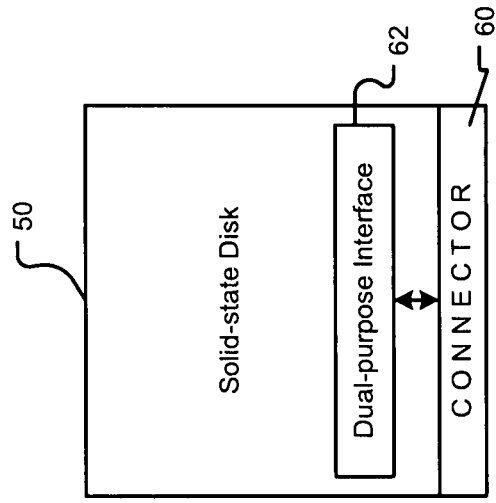
FIG. 4B is a functional block diagram of an exemplary solid-state disk according to the present disclosure.
Figure 4A:
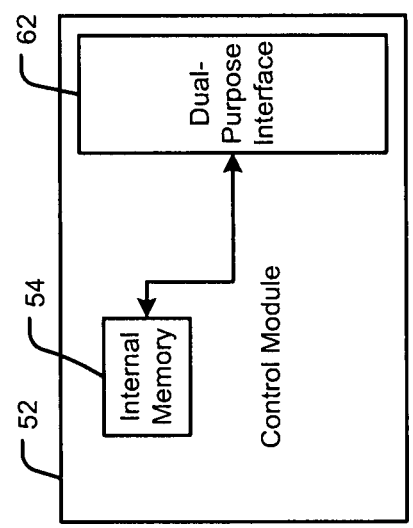
FIG. 4A is a functional block diagram of an exemplary control module used in a solid-state disk according to the present disclosure.

Referring now to FIGS. 4A-4B, the control module 52 may implement the I/O interface 58 and the memory interface 56 by a dual-purpose purpose interface 62. The dual-purpose interface 62 may communicate with the connector 60. Thus, the disk 50 may communicate with the host adapter 16 and the processor 12 via the dual-purpose interface 62.

Figure 5C:
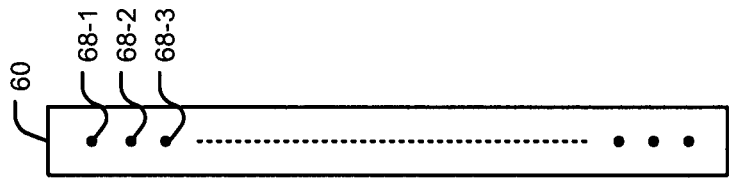
FIG. 5C shows exemplary connections of a connector of a solid-state disk according to the present disclosure.
Figure 5B:
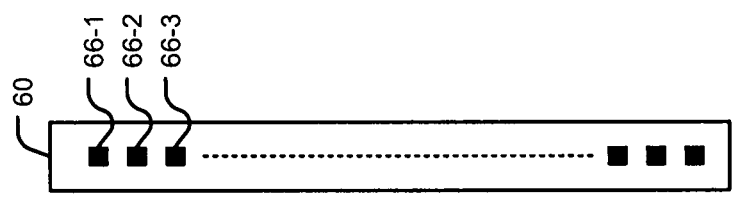
FIG. 5B shows exemplary connections of a connector of a solid-state disk according to the present disclosure.
Figure 5A:
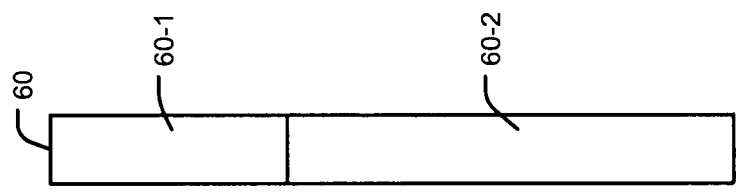
FIG. 5A shows an exemplary connector of a solid-state disk according to the present disclosure.

Referring now to FIGS. 5A-5C, the connector 60 may comprise a first connector 60-1 that communicates with the memory interface 56 and a second connector 60-2 that communicates with the I/O interface 58 as shown in FIG. 5A. In some implementations, the connector 60 may comprise an edge connector that includes edge connections 66-1, 66-2, 66-3, etc. (collectively, edge connections 66) as shown in FIG. 5B. In other implementations, the connector 60 may include pin connections 68-1, 68-2, 68-3, etc. (collectively, pin connections 68) as shown in FIG. 5C, wherein the pin connections 68 may be male, female, or a combination of both.

Alternatively, the connector 60 may include both edge connections 66 and pin connections 68. For example, the first connector 60-1 may include pin connections 68, and the second connector 60-2 may include edge connections 66, or vice versa. Additional implementations including multiplexing edge connections 66 and/or pin connections 68 to provide non-concurrent memory access across both the memory interface 56 and the I/O interface 58 are contemplated.

The disk 50 may be installed in a handheld device in a removable manner. In some implementations, the control module 52 may be installed in the disk 50 in a removable manner. At least one of the control module 52, the volatile memory 34, and the NVM 30 may be implemented by a single module or a single integrated circuit (IC).

Figure 6A:
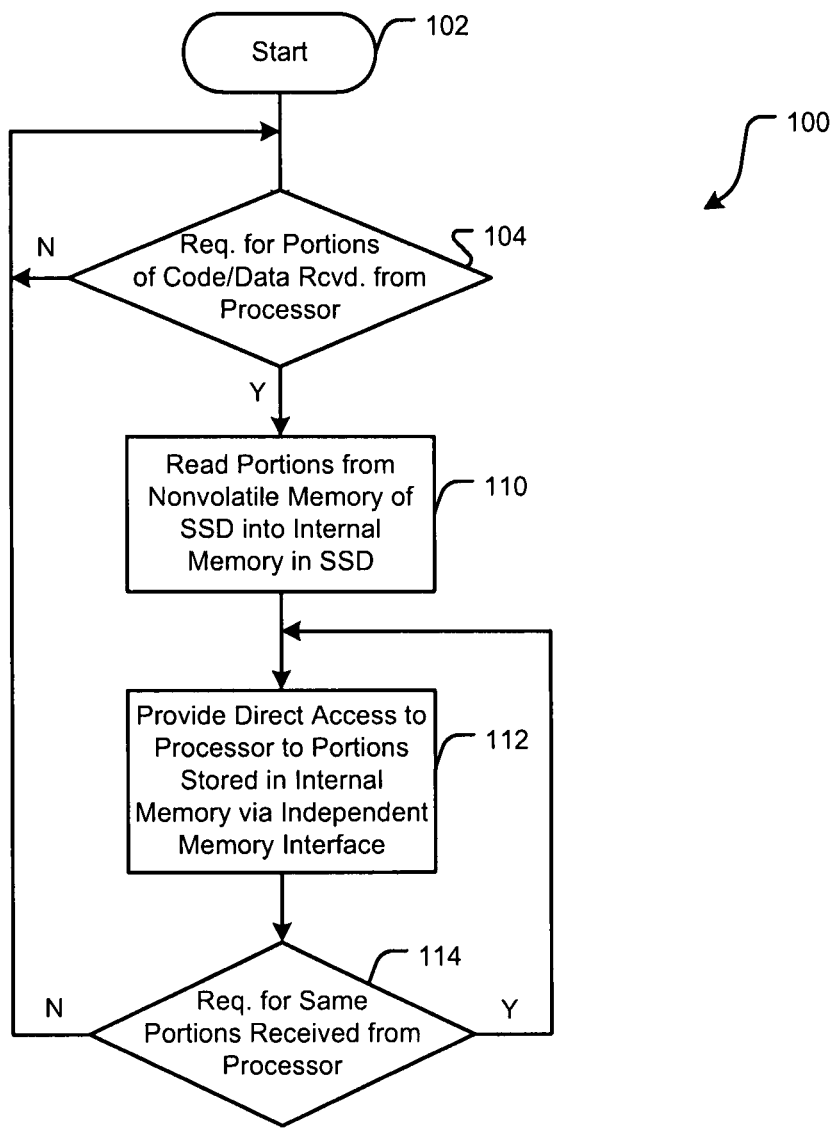
FIGS. 6A and 6B are flowcharts of exemplary methods for implementing memory in a solid-state disk, where the memory may be interfaced directly to a remote processor according to the present disclosure.

Referring now to FIG. 6A, a method 100 for implementing the internal memory 54 in the solid-state disk (disk) 50, where the internal memory 54 can be interfaced directly to the remote processor 12, is shown. The method 100 begins at step 102. The control module 52 that comprises the internal memory 54 determines in step 104 if the processor 12 requests portions of code (or data). If false, the control module 52 repeats step 104. If true, the control module 52 reads the portions from the NVM 30 into the internal memory 54 in step 110. The control module 52 provides the processor 12 a direct access to the portions stored in the internal memory 54 via the memory interface 56 in step 112. The control module 52 determines in step 114 if the processor 12 requests the same portions again. If true, the control module 52 repeats step 112. If false, the control module 52 repeats steps 104 through 114.

Figure 6B:
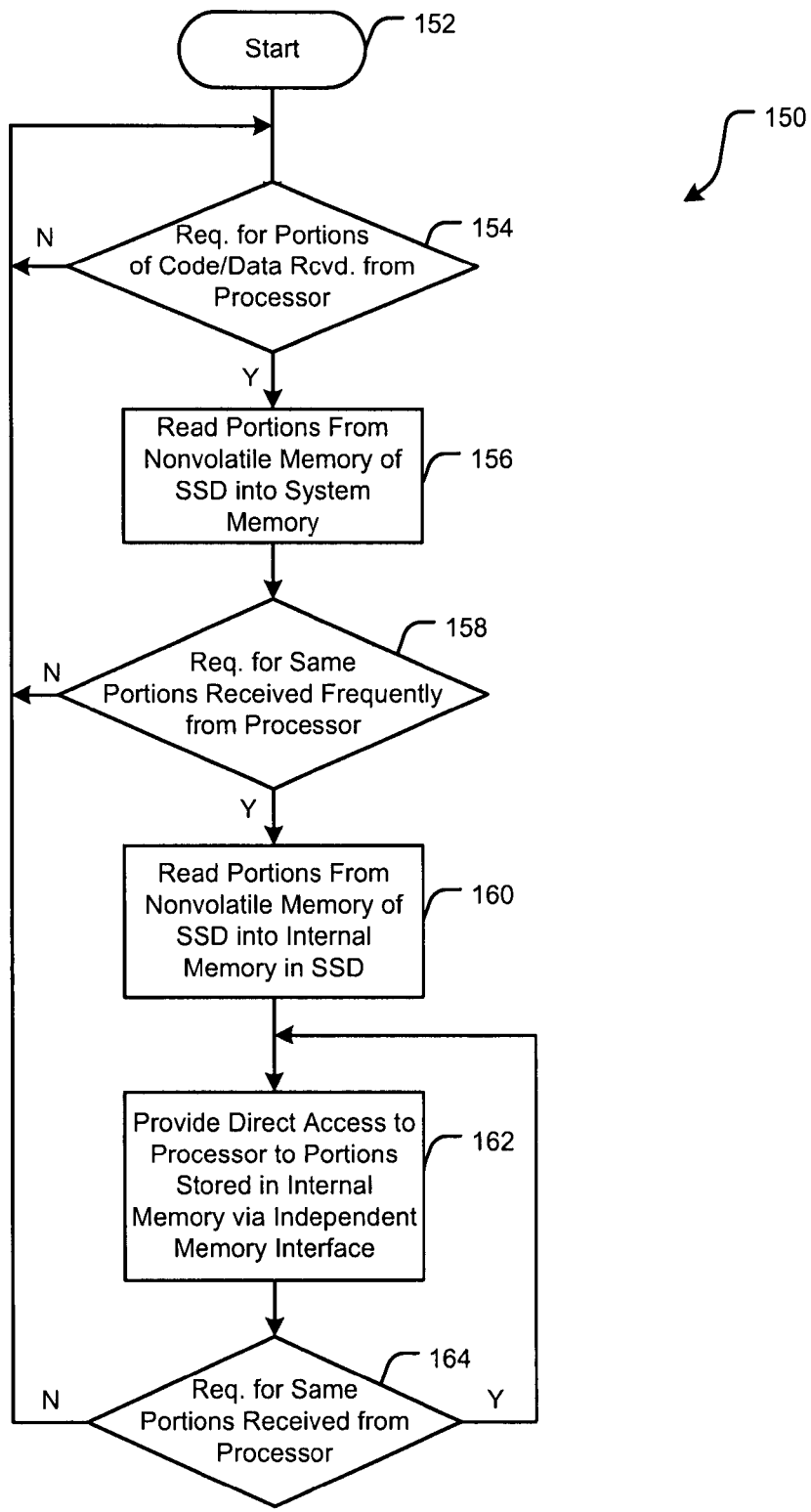

Referring now to FIG. 6B, a method 150 for implementing the internal memory 54 in the solid-state disk (disk) 50, where the internal memory 54 can be interfaced directly to the remote processor 12, is shown. The method 150 begins at step 152. The control module 52 that comprises the internal memory 54 determines in step 154 if the processor 12 requests portions of code and/or data. If false, the control module 52 repeats step 154. If true, the control module 52 reads the portions from the NVM 30 of the disk 50 into system memory 18 in step 156, where the system memory 18, the processor 12, and the disk 50 communicate via the system bus 20.

The control module 52 determines in step 158 if the processor 12 requests the same portions frequently. If false, however, the control module 52 repeats steps 154 through 158. If true, the control module 52 reads the portions from the NVM 30 into the internal memory 54 in step 160. The control module 52 provides the processor 12 a direct access to the portions stored in the internal memory 54 via the memory interface 56 in step 162. The control module 52 determines in step 164 if the processor 12 requests the same portions again. If true, the control module 52 repeats step 162. If false, the control module 52 repeats steps 154 through 164.

Figure 7A:
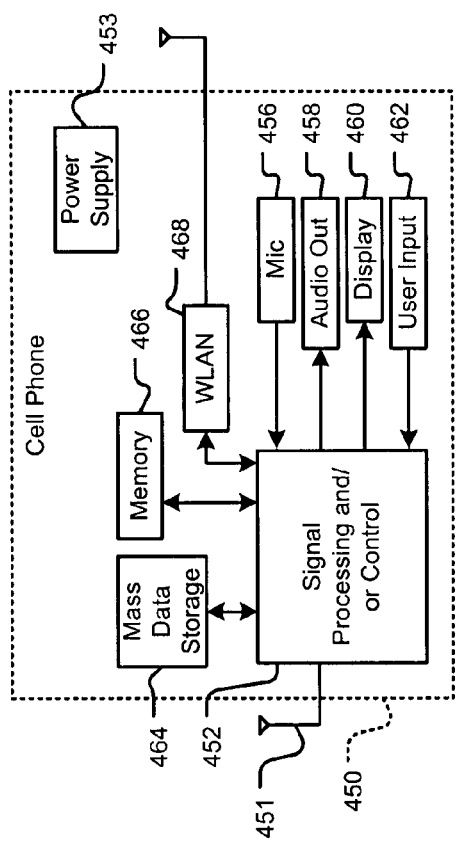
FIG. 7A is a functional block diagram of a cellular phone.
Figure 7B:
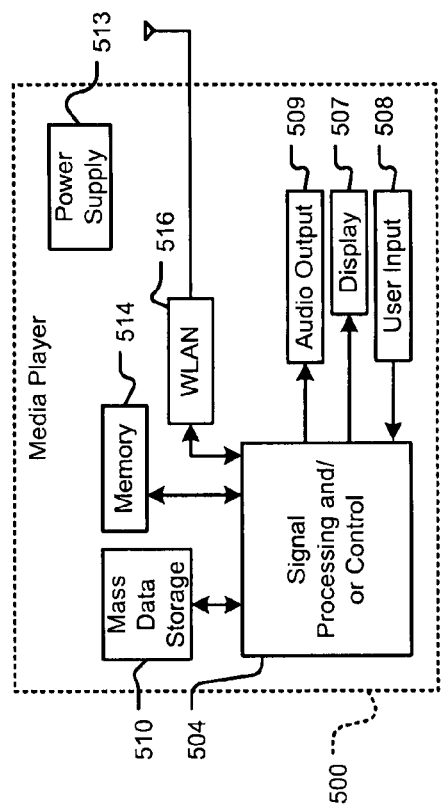
FIG. 7B is a functional block diagram of a media player.

Referring now to FIGS. 7A-7B, various exemplary implementations of the teachings of the present disclosure are shown. Referring now to FIG. 7A, the teachings of the present disclosure can be implemented in a mass data storage 464 of a cellular phone 450 that may include a cellular antenna 451. In some implementations, the cellular phone 450 includes a microphone 456, an audio output 458 such as a speaker and/or audio output jack, a display 460, and/or an input device 462 such as a keypad, a pointing device, and/or other input device. A signal processing and/or control circuit 452 and/or other circuits (not shown) in the cellular phone 450 may process data, perform coding and/or encryption, perform calculations, format data, and/or perform other cellular phone functions.

The cellular phone 450 may communicate with the mass data storage 464 that stores data in a nonvolatile manner. The mass data storage 464 may include a magnetic storage device such as a hard disk drive (HDD), a solid-state disk, and/or an optical storage device such as a DVD drive. The HDD may be a mini HDD that includes one or more platters having a diameter that is smaller than approximately 1.8". The cellular phone 450 may be connected to memory 466 such as RAM, ROM, low latency nonvolatile memory such as flash memory, and/or other suitable electronic data storage. The cellular phone 450 also may support connections to a WLAN via a WLAN interface 468.

Referring now to FIG. 7B, the teachings of the present disclosure can be implemented in a mass data storage 510 of a media player 500. In some implementations, the media player 500 includes a display 507 and/or a user input 508 such as a keypad, a touchpad, etc. In some implementations, the media player 500 may employ a graphical user interface (GUI) that typically employs menus, icons, and/or a point-and-click interface via the display 507 and/or user input 508. The media player 500 further includes an audio output 509 such as a speaker and/or audio output jack. A signal processing and/or control circuit 504 and/or other circuits (not shown) of the media player 500 may process data, including coding, encrypting, formatting, etc.

The media player 500 may communicate with the mass data storage 510 that stores data such as compressed audio and/or video content in a nonvolatile manner. In some implementations, the compressed audio files include files that are compliant with MP3 format or other suitable compressed audio and/or video formats. The mass data storage may include a magnetic storage device such as a hard disk drive (HDD), a solid-state disk, and/or an optical storage device such as a DVD drive. The HDD may be a mini HDD that includes one or more platters having a diameter that is smaller than approximately 1.8".

The media player 500 may be connected to memory 514 such as RAM, ROM, low latency nonvolatile memory such as flash memory, and/or other suitable electronic data storage. The media player 500 also may support connections to a WLAN via a WLAN interface 516. Still other implementations in addition to those described above are contemplated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A solid-state disk comprising:
nonvolatile semiconductor memory arranged in the solid-state disk;
a control module arranged in the solid-state disk, wherein the control module includes
a first interface configured to interface the nonvolatile semiconductor memory of the solid-state disk to a host adapter of a handheld device, wherein the first interface is an input/output interface of a hard disk drive;
a cache memory arranged in the control module, the cache memory configured to selectively cache at least one of code and data from the nonvolatile semiconductor memory; and
a second interface configured to (i) interface the cache memory directly to a processor of the handheld device, and (ii) output portions of the at least one of code and data from the cache memory to the processor, wherein the second interface is different than the first interface, wherein the processor of the handheld device is located external to the solid-state disk, and wherein the first interface is configured to interface the nonvolatile semiconductor memory of the solid-state disk with the processor via (i) the host adapter and (ii) a system bus of the handheld device; and
volatile memory arranged in the solid-state disk, wherein the volatile memory is arranged external to the control module, and wherein the volatile memory is separate from the cache memory,
wherein the control module is configured to read the at least one of code and data from the nonvolatile semiconductor memory of the solid-state disk into the volatile memory of the solid-state disk, and
wherein the cache memory is configured to cache the at least one of code and data from the volatile memory.

2. The control module of claim 1, wherein the control module is configured to read the at least one of code and data from the nonvolatile semiconductor memory into the cache memory in response to the processor communicating a plurality of requests for the at least one of code and data to the solid-state disk.

3. The control module of claim 1, wherein the nonvolatile semiconductor memory comprises flash memory.

4. The control module of claim 1, wherein the cache memory comprises one of volatile memory and nonvolatile memory.

5. The control module of claim 1, wherein the cache memory comprises one of static random access memory, flash memory, and magnetic random access memory.

6. The control module of claim 1, wherein the second interface comprises a parallel interface.

7. The control module of claim 1, wherein the first interface and the second interface are implemented by a combined interface.

8. An integrated circuit comprising the control module of claim 1.

9. A system comprising:
the solid-state disk of claim 1;
a first connector configured to connect to the first interface; and
a second connector configured to connect to the second interface,
wherein the first connector and the second connector are configured to removably connect the solid-state disk to the handheld device.

10. A method comprising:
arranging nonvolatile semiconductor memory in a solid-state disk;
controlling the solid-state disk using a control module arranged in the solid-state disk;
interfacing the nonvolatile semiconductor memory of the solid-state disk to a host adapter of a handheld device via a first interface, wherein the first interface is an input/output interface of a hard disk drive;
selectively caching at least one of code and data from the nonvolatile semiconductor memory into a cache memory arranged in the control module;
interfacing the cache memory directly to a processor of the handheld device via a second interface, wherein the second interface is different than the first interface, and wherein the processor of the handheld device is located external to the solid-state disk;
interfacing, using the first interface, the nonvolatile semiconductor memory of the solid-state disk to the processor via (i) the host adapter and (ii) a system bus of the handheld device;
arranging volatile memory (i) in the solid-state disk, and (ii) external to the control module, wherein the volatile memory is separate from the cache memory;
reading the at least one of code and data from the nonvolatile semiconductor memory of the solid-state disk into the volatile memory of the solid-state disk;
caching the at least one of code and data from the volatile memory into the cache memory; and
outputting portions of the at least one of code and data from the cache memory to the processor via the second interface.

11. The method of claim 10, further comprising reading the at least one of code and data from the nonvolatile semiconductor memory into the cache memory in response to the processor communicating a plurality of requests for the at least one of code and data to the solid-state disk.

12. The method of claim 10, wherein the nonvolatile semiconductor memory comprises flash memory.

13. The method of claim 10, wherein the cache memory comprises one of volatile memory and nonvolatile memory.

14. The method of claim 10, wherein the cache memory comprises one of static random access memory, flash memory, and magnetic random access memory.

15. The method of claim 10, further comprising implementing the second interface using a parallel interface.

16. The method of claim 10, further comprising combining the first interface and the second interface.

17. The method of claim 10, further comprising arranging the control module in an integrated circuit.

* * * * *